Oct. 17, 1950            E. KOLISCH            2,526,566
AUTOMATIC TEMPERATURE CONTROL ELECTRIC CIRCUIT
Filed June 17, 1948
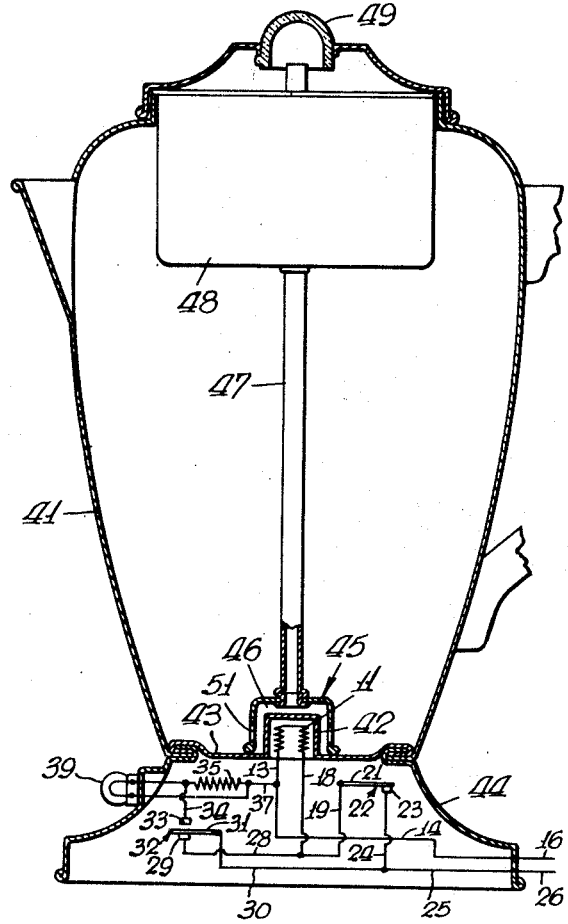
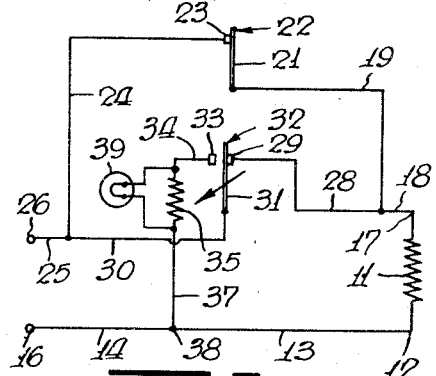
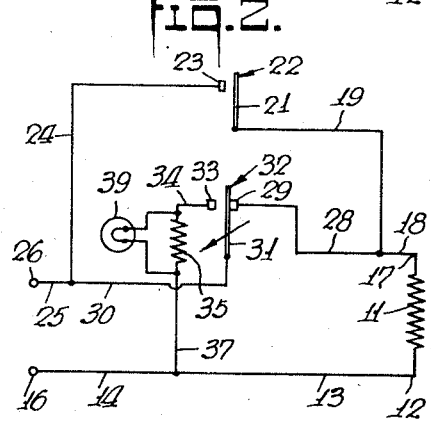
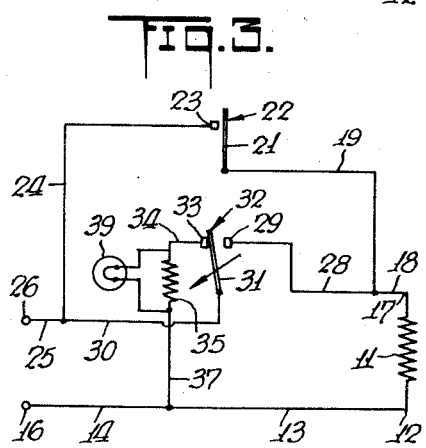
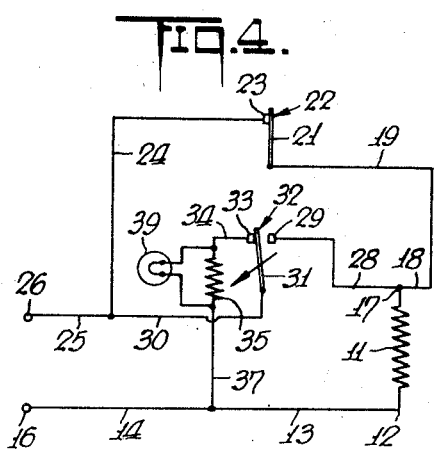
INVENTOR
*Emil Kolisch*
BY
*Dean Fairbank Hirsch*
ATTORNEYS Patented Oct. 17, 1950

2,526,566

UNITED STATES PATENT OFFICE 2,526,566

AUTOMATIC TEMPERATURE CONTROL ELECTRIC CIRCUIT

Emil Kolisch, New York, N. Y., assignor to Continental Silver Co., Inc., Brooklyn, N. Y., a corporation of New York Application June 17, 1948, Serial No. 33,574

4 Claims. (Cl. 219—20)

This invention relates to an automatic temperature control electric circuit, more particularly of the type for use with liquid heating appliances such as electric percolators.

It is among the objects of the invention to provide a circuit of the above type which is simple in design yet positive in operation, which may be incorporated in an electric liquid heating appliance with the minimum of expense, utilizing as it does but a minimum of wiring and few parts, all of which may be conventional, which operates dependably initially to heat the liquid in the appliance to a predetermined temperature and which, when such temperature has been reached, will lower the temperature of such liquid and positively maintain such lower temperature without the latter being affected by variation in the ambient temperature.

Acording to the invention, these objects are accomplished by the arrangement and combination of elements hereinafter described and particularly recited in the claims.

In the accompanying drawings in which are shown one or more of various possible embodiments of the several features of the invention, Fig. 1 is a diagrammatic view of the automatic temperature control circuit, Figs. 2 to 4 are views similar to Fig. 1 showing the circuit in various stages of operation, and Fig. 5 is a diagrammatic view of the automatic temperature control circuit as incorporated in a coffee percolator.

Referring now to the drawings, there is shown in the diagrammatic view of Fig. 1, the automatic temperature control circuit which includes a main heating circuit, a holding circuit and an auxiliary control circuit.

The main heating circuit includes the heating element 11, one end 12 of which is connected by leads 13 and 14 to terminal 16. The other end 17 of heating element 11 is connected by leads 18 and 28 to fixed contact 29 which is normally in engagement with the heat responsive switch arm 31 of thermostat 32, arm 31 being connected by leads 30 and 25 to terminal 26.

The holding circuit includes resistor 35 which is in close proximity to arm 31 and desirably thereagainst. One end of said resistor 35 is connected by leads 37 and 14 to terminal 16 and the other end of resistor 35 is connected by lead 34 to fixed contact 33 of thermostat 32 which is normally spaced from arm 31. Desirably a "tell tale" such as a bulb 39 is connected across resistor 35 to afford a visual indication of the flow of current therethrough.

The auxiliary control circuit which is shunted across thermostat 32 includes a thermostat 22, the heat responsive arm 21 of which is connected by leads 19 and 18 to the end 17 of heating element 11, and the fixed contact 23 of which is normally engaged by arm 21 and is connected by leads 24 and 25 to terminal 26.

Although the thermostats 22 and 32 may be of any conventional type either of the fixed type set to operate at a predetermined temperature or the variable type in which the temperature of operation may be varied by the user, in the circuit herein shown thermostat 22 is of the fixed type set to operate at around 160° F. and thermostat 32 is of the variable type set to operate at around 208° F., the former being set to operate at a temperature below that of the latter for the reason hereinafter set forth.

In order that the operation of the automatic temperature control circuit herein may be clearly understood, it is illustratively shown in Fig. 5 incorporated in a coffee percolator.

The coffee percolator which as it is conventional in construction is only shown diagrammatically and will be but briefly described, comprises a liquid container or receptacle 41 having a hollow casing 42 therein rising from the floor 43 thereof, in which the heating element 11 is positioned. The percolator also has a hollow base 44 mounting the receptacle 41 and in which the wiring and other elements of the automatic control circuit are positioned.

A conventional cold water pump 45 is provided including a well 46 encompassing casing 42 and a tube 47 rising in said receptacle 41 from said well 46. The tube mounts a coffee basket 48 near the top thereof and a lid or cover 49 is provided to close the receptacle.

As is diagrammatically shown in Fig. 5, thermostat 22 is placed adjacent the floor of the liquid container as is thermostat 32, the latter however being spaced from the thermostat 22 so that holding resistor 35 which is desirably against arm 31 in close heat transfer relation thereto will not affect thermostat 22 and both thermostats are sufficiently spaced from heating element 11 so as not to be materially affected thereby. With the elements so placed and connected as heretofore described, and with the coffee basket 48 filled with coffee and the liquid container filled with water and closed, the percolator is ready for use.

With a source of current applied to terminals 16 and 26, heating element 11 will be energized, the circuit being from terminal 16, leads 14, 13, heating element 11, leads 18, 28, fixed contact 29 and arm 31 thereagainst, leads 30 and 25 to terminal 26. A path for the current is also initially provided through the auxiliary control circuit from end 17 of heating element 11, leads 12 and 19, arm 21 and fixed contact 23 thereagainst, through leads 24 and 25 to terminal 26.

The energization of heating element 11 will, in a relatively short time in the order of three or four minutes, cause the water in the well 46 of the pump 45 around housing 42, which entered said well through openings 51, to boil and as steam is generated, it will lift the water up into tube 47 to discharge into the basket 48 in conventional manner to start the percolating action.

However, as the water in the receptacle 41 initially had a temperature of approximately 60° F. which is the usual temperature of tap water, it will take some time for the entire body of water therein to heat and consequently, although the percolation is going on, the floor of the container adjacent which the thermostats are positioned will heat quite slowly having substantially the same temperature as the water and hence the thermostats initially will not be affected.

As the percolation continues and boiled water is circulated through the receptacle, the temperature of the entire body of water therein will gradually rise and, in a typical arrangement, when it reaches 160° F., thermostat 22 which is set for this temperature will open and the circuit will be as shown in Fig. 2. However, by reason of the fact that arm 31 of thermostat 32 is slower acting than arm 21 of thermostat 22, it will remain against contact 29 and heating element 11 will still be in circuit, and the percolation will continue.

After approximately fifteen minutes of percolation which has been found sufficient for mild coffee, the temperature of the liquid in the container will have been raised to 208° F. for which thermostat 32 has been set so that arm 31 will then move away from contact 29, breaking the circuit to heating element 11 as shown in Fig. 3. This will stop further percolation as both the main circuit and the auxiliary circuit are now interrupted.

Thermostat 32 is so designed that almost as soon as arm 31 moves away from contact 29 it will engage contact 33. Thus as shown in Fig. 3, holding resistor 35 will then be energized, the circuit being from terminal 16, leads 14 and 37 through resistor 35, lead 34, fixed contact 33 and arm 31 thereagainst, leads 30 and 25 to terminal 26, bulb 39 across resistor 35 lighting at this time.

As resistor 35 is in close proximity to arm 31, it need dissipate but a slight amount of heat to keep the latter deflected against fixed contact 33. Thus the main circuit will remain open even though the ambient temperature should drop considerably.

As heating element 11 is no longer energized with both the main circuit and auxiliary circuit open, the liquid in the container will start to cool. When the temperature has dropped to about 158° F., thermostat 22 which has a temperature variation between opening and closing of about 2° F. will close as shown in Fig. 4.

Thus a circuit will again be completed to heating element 11 from terminal 16, leads 14 and 18, heating element 11, leads 18 and 19, arm 21 and contact 23 thereagainst, leads 24 and 25 to terminal 26.

As the heating element 11 will again be energized, the liquid about casing 42 will again be heated. However, before it can be heated sufficiently to cause percolation again to occur, the temperature of the liquid will have been raised to 160° F., at which time thermostat 22 will again open to break the circuit to heating element 11.

Thus we see that once percolation has stopped and the temperature of the liquid has dropped to 158° F. it will thereafter fluctuate between 158° F. and 160° F. which is the required temperature to keep the coffee hot but not sufficient to start the percolation again.

By means of the simple circuit herein described, automatic temperature regulation is provided which will in the first instance enable the coffee to percolate to the desired strength and thereupon retain the coffee hot without further percolation which would cause it to become too strong. As the holding resistor 35 is in close heat transfer relation to arm 31, even if a cold draft should strike the percolator, arm 31 will remain in open position and only thermostat 22 will be affected, and this thermostat although it will keep the coffee hot, will not let it get so hot as to enable the percolation action to start again.

As the circuit is automatic in operation there is no need for the user to time the same or to keep careful watch thereon and the provision of the indicating bulb in parallel with resistor 35 will give a visual indication of when the holding resistor is in circuit which will indicate that the coffee is ready for use.

If the user desires strong coffee, it is merely necessary to adjust thermostat 32 so that it will not operate until the temperature of the liquid has risen to say 211° F. This will give an added period of percolation which is necessary in order that the coffee be strong.

When the user desires to turn off the unit, it is merely necessary to disconnect the source of current from terminals 16 and 26. As resistor 35 is no longer energized, it will quickly cool and arm 31 will deflect and again engage contact 29. The cooling of the receptacle will also cause arm 21 to deflect against terminal 23. Thus the device will automatically be re-set for the next charge of coffee to be prepared.

It is also to be noted that the circuit herein will also function as a safety device to prevent destruction of the heating element and the percolator itself in the event the liquid in the container should evaporate. For if this should occur, the temperature of the container would quickly rise to 208° F. at which time the holding resistor would go in circuit, cutting out the main heater and as the latter never could remain continuously in circuit for any length of time due to the action of the thermostat 22, it would not become so hot as to burn out.

Although the action of thermostats 22 and 32, as herein illustratively shown, completely interrupts the flow of current through resistor 11, it is within the scope of this invention to provide additional circuit components so that thermostats 22 and 32 when operating will greatly reduce the current flow without necessarily breaking the circuit through resistor 11 and in such manner regulate the temperature of the contents of the receptacle.

It will be understood that the holding resistor 35 could be connected across thermostat 32, to be short-circuited when the thermostat is closed against contact 29 and to be placed in circuit when such thermostat opens. While this arrangement dispenses with the need for contact 33, it is less preferred because the specifications of the holding resistor become rather critical in such application. The arrangement set forth is within the scope of the broader claims herein.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A temperature control circuit for an electric heating receptacle comprising an electric heater for heating the contents of said receptacle, a switch in said circuit having a movable arm responsive to the heat generated in such receptacle and a pair of contacts straddling said arm, one of said contacts being normally engaged by said switch arm and connected to one end of said heater and the other of said contacts being normally spaced from said arm and in the path of movement thereof, a holding resistor in juxtaposition to said switch arm, connected at one end to said spaced contact and at its other end to the other end of said heater, means to connect said last named end of said heater and said switch arm to a source of current, an auxiliary circuit normally connecting said switch arm and said normally engaged contact, and heat responsive means intermittently to open and close said auxiliary circuit after said spaced contact is engaged by said switch arm.

2. A temperature control circuit for an electric heating receptacle comprising a heating element for heating the contents of said receptacle, a main circuit to connect said heater to a source of current, a normally closed heat responsive switch in said main circuit in series with said heating element and having a movable arm operative upon heating of the contents of said receptacle to a predetermined temperature to open said main circuit, a holding circuit for said switch including a resistor in close heat transfer relation thereto and normally disconnected from said source of current, means associated with said movable arm upon opening of said main circuit to connect said holding circuit to said main circuit and thereby energizing said resistor to retain said heat responsive switch in open position and an auxiliary circuit shunted across said heat responsive switch, said auxiliary circuit including heat responsive means periodically to connect and disconnect said heating element from said source of current.

3. A temperature control circuit comprising a main heating element, a thermostat having a movable heat responsive switch arm and a pair of fixed contacts, one of said contacts being normally engaged by said arm and connected to one end of said heating element, and the other of said contacts being normally spaced from said arm, connected at one end to said spaced contact and connected at its other end to the other end of said heating element, a heat responsive switch connected at one side to said normally engaged contact of said thermostat and at its other side to the heat responsive arm of said thermostat and a pair of terminals connected respectively to said heat responsive switch arm and to the connected together ends of said holding resistor and said heating element, whereby a source of current may be applied to said control circuit.

4. A temperature control circuit for an electric heating receptacle, comprising an electric heater therefor, means to connect said heater to a source of current, a normally closed switch in said circuit in series with said heater and responsive to the heat generated in said receptacle, an auxiliary circuit in parallel with said switch and in series with said heater, a holding resistor in close heat transfer relation to said switch, means associated with said switch upon opening of the latter and breaking of the circuit therethrough to said heater to connect said holding resistor in parallel with said heater thereby retaining said switch in open position, said auxiliary circuit having a heat responsive switch therein intermittently opening and closing the circuit to said heater after said first named switch has opened and said holding resistor is in circuit.

EMIL KOLISCH.

REFERENCES CITED

The following references are of record in the file of this patent:

UNITED STATES PATENTS

| Number | Name | Date |
| --- | --- | --- |
| 2,023,114 | Biebel | Dec. 3, 1935 |
| 2,046,718 | Bletz | July 7, 1936 |
| 2,076,096 | Samuels et al. | Apr. 6, 1937 |
| 2,179,936 | Keene | Nov. 14, 1939 |
| 2,287,584 | Weeks | June 23, 1942 |
| 2,365,615 | Woodman | Dec. 19, 1944 |